(12) United States Patent
Liu et al.

(10) Patent No.: US 11,320,631 B2
(45) Date of Patent: May 3, 2022

(54) LENS SYSTEM AND IMAGING DEVICE

(71) Applicant: ZHEJIANG DAHUA TECHNOLOGY CO., LTD., Zhejiang (CN)

(72) Inventors: Kai Liu, Hangzhou (CN); Wenqiang Pan, Hangzhou (CN); Hongxing Ding, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 69 days.

(21) Appl. No.: 16/823,521

(22) Filed: Mar. 19, 2020

(65) Prior Publication Data

US 2020/0218036 A1    Jul. 9, 2020

Related U.S. Application Data

(63) Continuation of application No. PCT/CN2018/106455, filed on Sep. 19, 2018.

(30) Foreign Application Priority Data

Sep. 19, 2017  (CN) .......................... 201710852551.4

(51) Int. Cl.
*G02B 13/00* (2006.01)
*G02B 9/12* (2006.01)
*H04N 5/225* (2006.01)

(52) U.S. Cl.
CPC ........... *G02B 13/0035* (2013.01); *G02B 9/12* (2013.01); *H04N 5/2254* (2013.01)

(58) Field of Classification Search
CPC ............... G02B 13/06; G02B 13/0035; G02B 15/143507; G02B 9/12; G02B 9/28; G02B 13/006; H04N 5/2254
See application file for complete search history.

(56) References Cited

U.S. PATENT DOCUMENTS

2006/0176577 A1   8/2006 Kobayashi
2009/0185293 A1   7/2009 Harada
(Continued)

FOREIGN PATENT DOCUMENTS

CN    103048773 A    4/2013
CN    104330873 A    2/2015
(Continued)

OTHER PUBLICATIONS

Extended European Search Report in European Application No. 18859078.0 dated Jul. 3, 2020, 10 pages.
(Continued)

*Primary Examiner* — Alicia M Harrington
(74) *Attorney, Agent, or Firm* — Metis IP LLC

(57) ABSTRACT

The present disclosure is related to a lens systems. The lens system includes, in order from an object side to an image side, a first lens group G1 having negative refractive power, a second lens group G2 having positive refractive power, a third lens group G3 having positive refractive power, and the lens system satisfies the $$a \leq \frac{f_1}{f'} \leq b, c \leq \frac{f_2}{f'} \leq d, e \leq \frac{f_3}{f'} \leq f,$$

following condition: and at least partial of G3 is made of material satisfying the following condition: Vd>g and dn/dt≤h, wherein a, b, c, d, e, f, g and h are constants, $f_1$ represents a focal length of G1, $f_2$ represents a focal length of G2, $f_3$ represents a focal length of G3, f' represents a focal length of the lens system, Vd represents an abbe constant, n represents a refractive index, t represents temperature, and dn/dt represents a differential of refractive indices against temperature.

18 Claims, 9 Drawing Sheets

(56) References Cited

U.S. PATENT DOCUMENTS

| | | |
|---|---|---|
| 2011/0109976 A1 | 5/2011 | Amano |
| 2012/0307374 A1 | 12/2012 | Kato et al. |
| 2016/0202456 A1 | 7/2016 | Kuo et al. |
| 2016/0252707 A1* | 9/2016 | Emi ................ G02B 13/04 348/148 |
| 2017/0153430 A1* | 6/2017 | Iijima ............ G02B 15/1465 |
| 2018/0188481 A1 | 7/2018 | Zuo |

FOREIGN PATENT DOCUMENTS

| | | | |
|---|---|---|---|
| CN | 104407431 A | | 3/2015 |
| CN | 204229037 U | | 3/2015 |
| CN | 105629443 A | | 6/2016 |
| CN | 205485024 U | | 6/2016 |
| CN | 106291687 A | | 1/2017 |
| CN | 106324798 A | | 1/2017 |
| CN | 106324806 A | | 1/2017 |
| CN | 106772935 | * | 5/2017 ........... G02B 13/005 |
| JP | 2005283648 A | | 10/2005 |
| WO | 2019057070 A1 | | 3/2019 |

OTHER PUBLICATIONS

Anonymous, Temperature Coefficient of the Refractive Index, Technical Information Advanced Optics, 10 pages, 2016, retreieved from< https://www.schott.com/d/advanced_optics/3794eded-edd2-461d-aec5-0a1d2dc9c523/1.1/schott_tie-19_temperature_coefficient_of_refractive_index_eng.pdf>.

International Search Report in PCT/CN2018/106455 dated Dec. 21, 2018, 5 pages.

Written Opinion in PCT/CN2018/106456 dated Dec. 21, 2018, 6 pages.

* cited by examiner

LENS SYSTEM AND IMAGING DEVICE

CROSS-REFERENCE TO RELATED APPLICATIONS

This application is a continuation of International Application No. PCT/CN2018/106455 filed on Sep. 19, 2018, which claims priority of Chinese Patent Application No. 201710852551.4 filed on Sep. 19, 2017, the contents of each of which are incorporated herein by reference.

TECHNICAL FIELD

This disclosure generally relates to optical devices, and more particularly, to a lens system and an imaging device with the lens system.

BACKGROUND

Wide angle lenses (e.g., fisheye lens) play an important role in the field of security monitoring due to their field of view (FOV) that are above 180 degrees. However, few existing wide angle lenses can achieve an ultra-high definition resolution (e.g., a 4K resolution). Areas of image planes of these existing lens are relatively small, and the utilization rate of image sensors in these existing lens are relatively low. In addition, ratios of total track length (TTL) of some existing lens to the focal length of the existing lens are relatively large, which may make it difficult to control the size of the lens. Furthermore, some existing lens may have a virtual focus problem when operating in a high temperature environment (e.g., 70° C.) and/or a low temperature environment (e.g., −30° C.), which may lead to a poor image quality and a low product reliability. Therefore, it is desirable to provide a lens system that can achieve a relatively high image quality and a relatively high operating reliability.

SUMMARY

According to an aspect of the present disclosure, a lens system may include a first lens group having negative refractive power, a second lens group having positive refractive power, a third lens group having positive refractive power, and the lens system may satisfy the following condition:

$$a \leq \frac{f_1}{f'} \leq b, c \leq \frac{f_2}{f'} \leq d, e \leq \frac{f_3}{f'} \leq f,$$

and at least partial of the third lens group is made of material satisfying the following condition: Vd>g and dn/dt≤h, wherein a, b, c, d, e, f, g and h are constants, $f_1$ represents a focal length of the first lens group, $f_2$ represents a focal length of the second lens group, $f_3$ represents a focal length of the third lens group, f' represents a focal length of the lens system, Vd represents an abbe constant, n represents a refractive index, t represents temperature, and dn/dt represents a differential of refractive indices against temperature.

In some embodiments, the first lens group may include, in order from the object side to the image side, a first lens having negative refractive power, a second lens having negative refractive power, and a third lens having negative refractive power.

In some embodiments, each of the first lens and the second lens may be a meniscus lens having a convex surface facing the object side.

In some embodiments, the third lens may be a planoconcave lens having a plane lens surface and a concave lens surface, and the plane lens surface faces the object side.

In some embodiments, the third lens may be a meniscus lens having a convex surface facing the object side.

In some embodiments, the second lens group may include, in order from the object side to the image side, a fourth lens having negative refractive power, a fifth lens having positive refractive power, and a sixth lens having positive refractive power.

In some embodiments, the fourth lens may be a meniscus lens having a concave surface facing the object side.

In some embodiments, the fourth lens may be a planoconcave lens having a plane lens surface and a concave lens surface, and the concave lens surface faces the object side.

In some embodiments, the fifth lens may be a biconvex lens.

In some embodiments, the fifth lens may be a planoconvex lens having a plane lens surface and a convex lens surface, and the plane lens surface faces the object side.

In some embodiments, the sixth lens may be a meniscus lens having a concave surface facing the image side.

In some embodiments, the fourth lens and the fifth lens may be commented together.

In some embodiments, the third lens group further comprises, in order from the object side to the image side, a seventh lens having positive refractive power, an eighth lens having negative refractive power, a ninth lens having positive refractive power, and a tenth lens having positive refractive power.

In some embodiments, the seventh lens may be a planoconvex lens having a plane lens surface and a convex lens surface, and the plane lens surface faces the object side.

In some embodiments, the eighth lens may be a meniscus lens having a concave surface facing the object side.

In some embodiments, the ninth lens may be a biconvex lens.

In some embodiments, the tenth lens may be a meniscus lens having a concave surface facing the image side.

In some embodiments, the seventh lens and the eighth lens may be commented together.

In some embodiments, the lens system may satisfy the following condition:

$$-1.4 \leq \frac{f_1}{f'} \leq -1.1, 2.6 \leq \frac{f_2}{f'} \leq 3.0, 2.6 \leq \frac{f_3}{f'} \leq 3.0.$$

In some embodiments, at least partial of the third lens group may be made of material satisfying the following condition: Vd>68, and dn/dt≤−−5.6×10$^{-6}$/° C.

In some embodiments, the seventh lens, the ninth lens, and the tenth lens may be made of material satisfying the following condition: Vd>68 and dn/dt≤−5.6×10$^{-6}$/° C.

In some embodiments, the seventh lens may be made of material satisfying the following condition: Vd>68 and dn/dt≤−5.6×10$^{-6}$/° C.

In some embodiments, the seventh lens and the ninth lens may be made of material satisfying the following condition: Vd>68 and dn/dt≤−5.6×10$^{-6}$/° C.

In some embodiments, the seventh lens and the tenth lens may be made of material satisfying the following condition: Vd>68 and dn/dt≤−5.6×10$^{-6}$/° C.

In some embodiments, a ratio of total track length of the lens system to the focal length of the lens system may be less than 11.

In some embodiments, the total track length of the lens system may be less than 27.6 mm.

In some embodiments, a field of view of the lens system may be not less than 185 degrees.

In some embodiments, the lens system may include an aperture stop between the second lens group and the third lens group.

In some embodiments, the lens system may include an infrared filter.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

Figure 1:
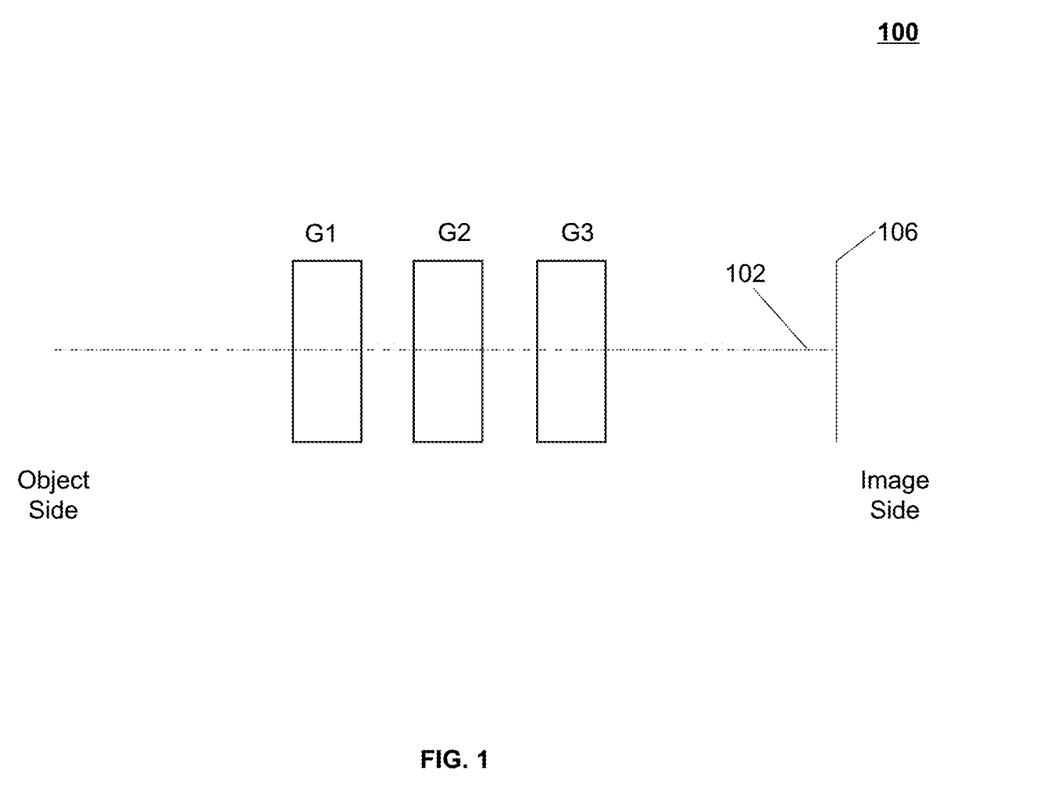
FIG. 1 is a schematic diagram illustrating an exemplary lens system according to some embodiments of the present disclosure.

FIG. 1 is a schematic diagram illustrating an exemplary lens system according to some embodiments of the present disclosure.

As shown in FIG. 1, the lens system 100 may include a first lens group G1, a second lens group G2, a third lens group G3, and an image plane 106 in sequence from an object side to an image side along an optical axis 102 of the lens system 100. As used herein, the image plane 106 refers to a plane that is vertical to the optical axis 102 and includes an object's projected image generated based on the lens system 100. In some embodiments, the lens system 100 may be a wide angle lens (e.g., a fisheye lens) having a field of view (FOV) above 180 degrees.

In some embodiments, G1 may have negative refractive power, G2 may have positive refractive power, and G3 may have positive refractive power. The refractive power (also referred to as optical power) refers to the degree to which an optical system (e.g., the lens system 100) converges or diverges light (also referred to as rays). For example, if the optical system has positive refractive power, the optical system may converge the incident light of the optical system. If the optical system has negative refractive power, the optical system may diverge the incident light of the optical system. The larger the absolute value of the refractive power is, the larger the degree to which the optical system may converge or diverge the incident light.

In some embodiments, the focal lengths of the lens system 100 may satisfy formulas (1)~(3) below:

$$a \leq \frac{f_1}{f'} \leq b, \tag{1}$$

$$c \leq \frac{f_2}{f'} \leq d, \quad (2)$$

$$e \leq \frac{f_3}{f'} \leq f, \quad (3)$$

wherein a, b, c, d, e, and f are constants, $f_1$ represents a focal length of the first lens group G1, $f_2$ represents a focal length of the second lens group G2, $f_3$ represents a focal length of the third lens group G3, f' represents a focal length of the lens system 100.

In some embodiments, a, b, c, d, e, and f may be set as specific values to ensure the size (e.g., a total track length) of the lens system 100. Merely by way of example, a may be equal to −1.40, b may be equal to −1.10, c may be equal to 2.60, d may be equal to 3.00, e may be equal to 2.60, and f may be equal to 3.00. Therefore, the focal lengths of the lens system 100 may satisfy formulas (4)~(6) below:

$$-1.40 \leq \frac{f_1}{f'} \leq -1.10, \quad (4)$$

$$2.60 \leq \frac{f_2}{f'} \leq 3.00, \quad (5)$$

$$2.60 \leq \frac{f_3}{f'} \leq 3.00. \quad (6)$$

In some embodiments, with the action of G1, G2, G3, and/or the values of a, b, c, d, e, and f in formulas (1)-(3), the total track length (TTL) of the lens system 100 may be relatively small. For example, the total track length (TTL) of the lens system 100 may be 27.6 mm. Accordingly, the structure (e.g., volume, length, height) of the lens system 100 may be controlled by constraining the assignment of refractive power of each lens group in the lens system 100. The lens systems 100 may be more widely used due to its suitable structure. The cost of the lens systems 100 may also be reduced.

In some embodiments, a lens group (e.g., G1~G) may include two or more lenses. In some embodiments, at least one lens of G3 may be made of material satisfying formulas (7)~(8) below:

$$Vd > g, \quad (7)$$

$$dn/dt \leq h, \quad (8)$$

wherein g and h are constants, Vd represents an abbe constant, n represents a refractive index, t represents temperature, and dn/dt represents a differential of refractive index against temperature (e.g., temperature ranging from 20° C. to 40° C.).

In some embodiments, g and h may be set as specific values to ensure the reliability of the lens system 100 in different temperature environments. Merely by way of example, g may be equal to 68, and h may be equal to 5.6×10$^{-6}$/° C. Therefore, at least one lens of G3 may be made of material satisfying formulas (9)~(10) below:

$$Vd > 68, \quad (9)$$

$$\frac{dn}{dt} \leq 5.6 \times \frac{10^{-6}}{°C}. \quad (10)$$

In some embodiments, with the action of G1, G2, G3, and/or the values of a, b, c, d, e, f, g, and h in formulas (1)~(3), (7), and (8), the reliability of the lens system 100 at different temperatures may be improved. For example, the lens system 100 may operate in a high temperature environment (e.g., 70° C.) and/or a low temperature environment (e.g., −30° C.) without a virtual focus problem. As used herein, a high temperature may refer to a temperature higher than the room temperature (i.e., 20° C.), such as 30° C., 35° C., 40° C., 45° C., 50° C., 55° C., 60° C., 65° C., 70° C. 75° C., 80° C., etc. A low temperature may refer to a temperature lower than the room temperature (i.e., 20° C.), such as 15° C., 10° C., 5° C., 0° C., −5° C., −10° C., −15° C., −20° C. −25° C., −30° C., −35° C. , −40° C., −45° C., etc.

Figure 2:
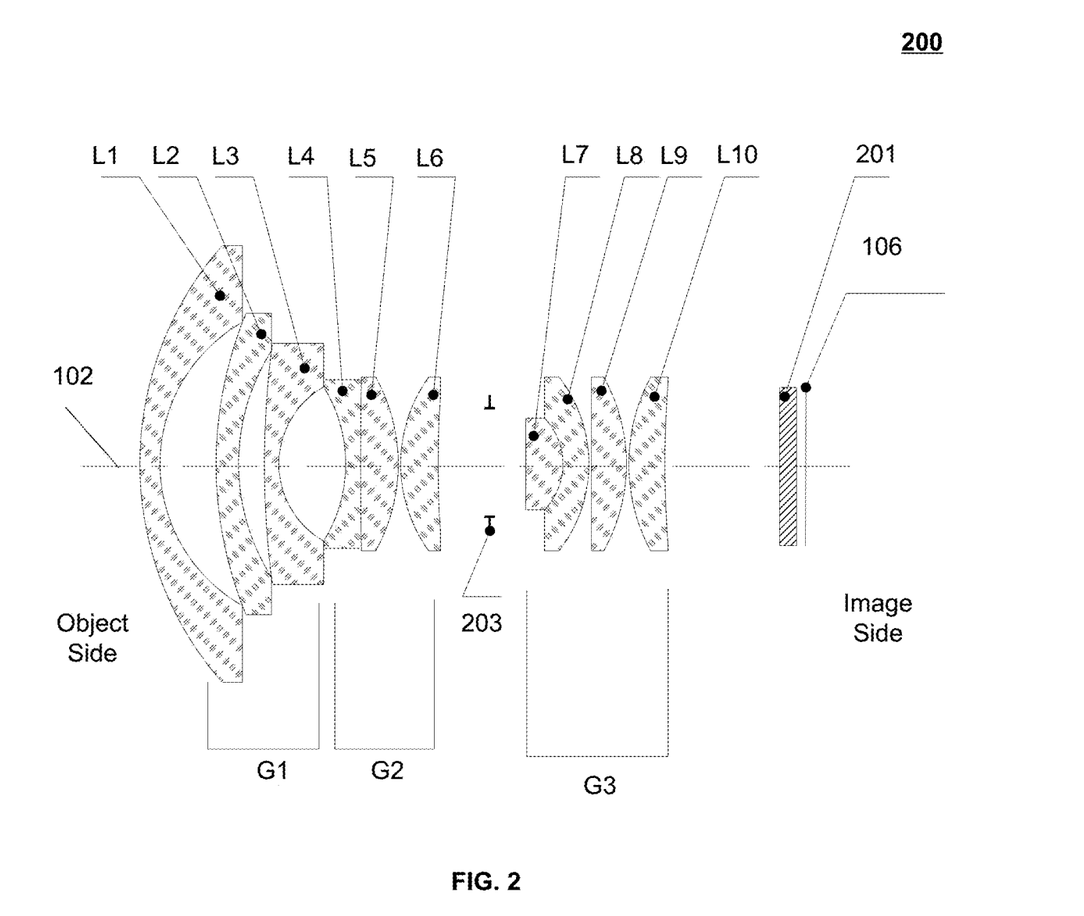
FIG. 2 is a schematic diagram illustrating an exemplary lens system according to some embodiments of the present disclosure.

In some embodiments, the lens system 100 may also include one or more aperture stops (not shown in FIG. 1) and/or one or more color filters (not shown in FIG. 1) as described in FIG. 2.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 2 is a schematic diagram illustrating an exemplary lens system according to some embodiments of the present disclosure. In some embodiments, the lens system 200 in FIG. 2 may be an example of the lens system 100 in FIG. 1.

As shown in FIG. 2, the lens system 200 may include a first lens group G1 having negative refractive power, a second lens group G2 having positive refractive power, an aperture stop 203, a third lens group G3 having positive refractive power, and an infrared filter 201 in sequence from an object side to an image side along an optical axis 102 of the lens system 200.

Taking the embodiment in which the lenses in the lens system 200 are spherical lenses as an example, G1 may include a first lens L1 having negative refractive power, a second lens L2 having negative refractive power, and a third lens L3 having negative refractive power in sequence from the object side to the image side along the optical axis 102 of the lens system 200. The first lens group may be used to collect incident light over a large angle, which may increase field of view of the lens system 200.

In some embodiments, each of the first lens L1 and the second lens L2 may be a meniscus lens. A meniscus lens is a lens having two spherically curved surfaces, one convex and the other concave. A meniscus lens having positive refractive power may be thicker in the middle than at the edges and serve as a converging lens. A meniscus lens having negative refractive power (e.g., L1 and L2 in FIG. 2) may be thicker at the edges than in the middle and serve as a diverging lens. In some embodiments, each of the first lens L1 and the second lens L2 may be with a convex surface toward the object side (also referred to as object-side surface) of the lens system 200. In some embodiments, the third lens L3 may be with a concave surface toward the image side (also referred to as image-side surface) of the lens system 200. The surface of L3 toward the object side of the lens system 200 (e.g., the object-side surface of L3) may be a convex surface, or a plane surface. For example, L3 may be a planoconcave lens with a concave image-side surface and a plane object-side surface (e.g., as shown in FIG. 2), or a meniscus lens with a concave image-side surface and a convex object-side surface. A planoconcave lens is a lens having a plane lens surface and a concave lens surface. A planoconcave lens may be thicker at the edges than in the middle.

In some embodiments, G2 may include a fourth lens L4 having negative refractive power, a fifth lens L5 having positive refractive power, and a sixth lens L6 having positive refractive power in sequence from the object side to the image side along the optical axis 102 of the lens system 200. The second lens group G2 may be used to change the angle of incident light so that the light may enter the pupil of a person.

In some embodiments, the fourth lens L4 may be with a concave surface toward the object side of the lens system 200. The surface of L4 toward the image side of the lens system 200 (e.g., the image-side surface of L4) may be a convex surface, or a plane surface. For example, L4 may be a planoconcave lens with a concave object-side surface and a plane image-side surface (e.g., as shown in FIG. 2), or a meniscus lens with a concave object-side surface and a convex image-side surface. The fifth lens L5 may be with a convex surface toward the image side of the lens system 200. The surface of L5 toward the object side (e.g., the object-side surface of L5) of the lens system 200 may be a convex surface, or a plane surface. For example, the fifth lens L5 may be a biconvex lens with a convex object-side surface and a convex image-side surface, or a planoconvex lens with a plane object-side surface and a convex image-side surface (e.g., as shown in FIG. 2). The sixth lens L6 may be a meniscus lens with a concave image-side surface and a convex object-side surface as shown in FIG. 2.

In some embodiments, G3 may include a seventh lens L7 having positive refractive power, an eighth lens L8 having negative refractive power, a ninth lens L9 having positive refractive power, and a tenth lens L10 having positive refractive power in sequence from the object side to the image side along the optical axis 102 of the lens system 200.

In some embodiments, the seventh lens L7 may be a planoconvex lens with a plane object-side surface and a convex image-side surface. The eighth lens L8 may be a meniscus lens with a concave object-side surface and a convex image-side surface. The ninth lens L9 may be a biconvex lens with a convex image-side surface and a convex object-side surface. In some embodiments, the ninth lens L9 may be a planoconvex lens with a convex object-side surface. The tenth lens L10 may be a meniscus lens with a concave image-side surface and a convex object-side surface.

In some embodiments, at least one lens (e.g., the seventh lens L7) of G3 may be made of material satisfying formulas (11)~(12) below:

$$Vd > 68, \quad (11)$$

$$\frac{dn}{dt} \leq 5.6 \times \frac{10^{-6}}{°C}. \quad (12)$$

For example, the seventh lens L7 and the ninth lens L9 are made of material satisfying formulas (11)~(12). As still another example, seventh lens L7 and the tenth lens L10 are made of material satisfying formulas (11)~(12). As still another example, the seventh lens L7, the ninth lens L9, and the tenth lens L10 are made of material satisfying formulas (11)~(12). It should be noted that, the seventh lens L7, the ninth lens L9, and the tenth lens L10 play an important role in maintaining the operating reliability of the lens system 200 at different temperatures. By setting the abbe constants and refractive indices of L7, L9, and L10, the influence of temperature on the operating stability of the lens system 200 may be eliminated, which may improve the operating reliability of the lens system 200 in different temperature environments.

In some embodiments, two or more lens may be cemented together. In some embodiments, the cementation of a lens having the positive refractive power (e.g., L5, L7) and a lens having the negative refractive power (e.g., L4, L8) may reduce aberrations of the lens system 200, such as spherical aberration, astigmatism, axial chromatic aberration, etc. For example, L4 and L5 may be cemented together as shown in FIG. 2. As another example, L7 and L8 may be cemented together as shown in FIG. 2.

In some embodiments, at least part of two adjacent lens may be connected with each other. For example, the edge of L1 may be connected with the edge of L2. As another example, the edge of L2 may be connected with the edge of L3. As still another example, the edge of L3 may be connected with the edge of 4.

In some embodiments, one or more aperture stops may be configured in a specific location along the optical axis 102 of the lens system 200. As shown in FIG. 2, the aperture stop 203 may be configured between L6 and L7. The aperture stop 203 may be a stop or lens ring, which limits the amount of light that can reach the image plane 106. The aperture stop may also correct aberrations (e.g., spherical aberration, astigmatism, distortion) of the lens system 200.

In some embodiments, one or more color filters (e.g., the infrared filter 201) may be configured to correct color deviation of light incident to the lens system 200. As shown in FIG. 2, the infrared filter 201 may be configured between G3 and the image plane 106. The infrared filter 201 may prevent visible light from passing through while only allowing infrared light to strike an image sensor of the lens system 200.

In some embodiments, exemplary optical parameters of G1, G2, G3, and the infrared filter 201 in the lens system 200 are illustrated in Table 1.

TABLE 1

Optical parameters of optical elements in the lens system 200

| Surface Number | Radius of Curvature R (mm) | Surface Distance $T_c$ (mm) | Refractive Index $N_d$ | Abbe Number $V_d$ |
|---|---|---|---|---|
| 1 | 13.678 | 0.850 | 1.850 | 23.800 |
| 2 | 6.753 | 2.361 | — | — |
| 3 | 16.960 | 0.926 | 1.830 | 37.300 |
| 4 | 9.001 | 1.027 | — | — |
| 5 | 37.013 | 0.600 | 1.630 | 63.400 |
| 6 | 3.679 | 2.717 | — | — |
| 7 | −6.324 | 0.711 | 1.620 | 56.700 |
| 8 | 182.179 | 1.661 | 1.690 | 54.600 |
| 9 | −7.777 | 0.100 | — | — |
| 10 | 5.853 | 1.574 | 1.810 | 25.500 |
| 11 | 32.663 | 1.544 | — | — |
| 12 | Infinity | 2.012 | — | — |
| 13 | −97.431 | 1.341 | 1.500 | 81.600 |
| 14 | −2.650 | 1.194 | 1.920 | 18.900 |
| 15 | −5.814 | 0.100 | — | — |
| 16 | Infinity | 1.450 | 1.440 | 95.100 |
| 17 | −7.202 | 0.100 | — | — |
| 18 | 7.581 | 1.472 | 1.500 | 81.600 |
| 19 | 45.324 | 4.000 | — | — |
| 20 | Infinity | 0.750 | 1.520 | 64.200 |
| 21 (infrared filter) | Infinity | 1.112 | — | — |

Each lens in the lens system 200 may include two surfaces, an object-side surface and an image-side surface. As shown in Table 1, each value in the column of "Surface Number" represents the serial number of each surface of the lenses in the lens system 200, wherein "1" in the column of "Surface Number" represents the serial number of the object-side surface of L1, "2" in the column of "Surface Number" represents the serial number of the image-side surface of L1, "3" in the column of "Surface Number" represents the serial number of the object-side surface of L2, and the serial number is sequentially increased toward the image side.

Each value in the column of "Radius of Curvature R (mm)" represents the radius of curvature of a corresponding lens surface. Each value in the column of "Surface Distance $T_c$ (mm)" represents the distance along the optical axis 102 between a corresponding lens surface and the next lens surface. For example, "0.850" in the column of "Surface Distance $T_c$ (mm)" represents the distance along the optical axis 102 between lens surface 1 (e.g., the object-side surface of L1) and lens surface 2 (e.g., the image-side surface of L1) is 0.850 mm.

Each value in the column of "Refractive Index $N_d$" in Table 1 represents the refractive index of the medium between a corresponding lens surface and the next lens surface relative to d light. As used herein, d light refers to sodium yellow light with a wavelength of 589.3 nm. Each value in the column of "Abbe Number Vd" in Table 1 represents the Abbe number of the medium between a corresponding lens surface and the next lens surface relative to d light. The Abbe number may be a measure of a medium's dispersion (variation of refractive index versus wavelength), with high values indicating low dispersion. The refractive index and the Abbe number of a lens may depend on the material of the lens.

According to the structure of the lens system 200 illustrated in FIG. 2 and the optical parameters illustrated in Table 1, the lens system 200 may have the optical performance below:
Total Track Length (TTL)≤27.6 mm;
Focal length f':2.6 mm;
Field of View (FOV): 185° (W);
Aperture F/#: 2.2 (constant aperture);
Image Plane Size: 7.6 mm;
f1/f'=−1.257;
f2/f'=2.780; and f4/f'=2.748.

Accordingly, a ratio of total track length (e.g., ≤27.6 mm) of the lens system 200 to the focal length (e.g., 2.6 mm) of the lens system 200 is less than 11, and a ratio of image plane size (e.g., 7.6 mm) of the lens system 200 to total track length (e.g., ≤27.6 mm) of the lens system 200 is greater than 0.26. In the case that the total track length of the lens system 200 is same as that of extising lens systems in the prior art, the image plane size of the lens system 200 can be set larger. In the case that the image plane size of the lens system 200 is same as that of extising lens systems in the prior art, the total track length of the lens system 200 can be set smaller. Thus, the miniaturization of the lens system 200 can be achieved.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the values of the radius of curvature, the surface distance, the refractive index, the Abbe number of each lens in the lens system 200 are not limited to the values shown in Table 1 and may take different values.

Figure 3:
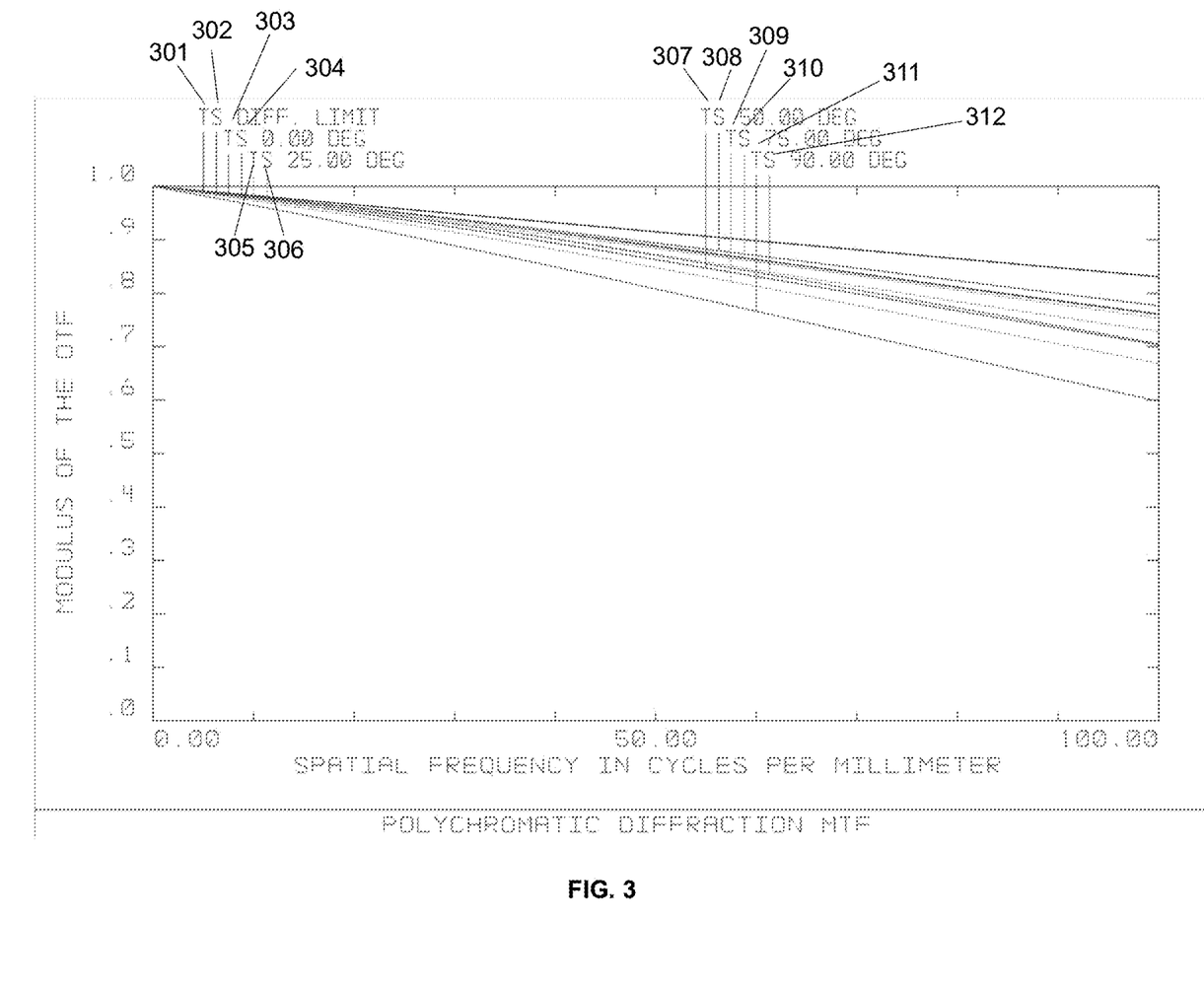
FIG. 3 is a schematic diagram of modulation transfer function (MTF) curve of a lens system at 20° C. according to some embodiments of the present disclosure.

FIG. 3 is a schematic diagram of modulation transfer function (MTF) curve of the lens system 200 at 20° C. according to some embodiments of the present disclosure.

In some embodiments, a diagram of MTF curve of a lens system may assess the imaging quality of the lens system. During the process of generating the MTF curve, one or more patterns each of which includes a pluraltiy of stripes in black alternating with white may be captured using the lens system 200. In a pattern, the density of the black and white stripes may be represented by "spacial frequency" in line pairs per millimeter (lp/mm). Each line pair may include a black strip and the adjacent white stripe. The density of the black and white stripes in a pattern may be constant or varying. The difference between the captured pattern and the image of the captured pattern may be measured and quantified by the MTF value. The larger the MTF value is, the less the difference between the captured pattern and the image of the captured pattern may be. The MTF may be the modulus of the optical transfer function (OTF). In some embodiments, the pattern may be placed in a circle (e.g., the field of view of the lens system 200) along the radial direction (e.g., the black and white stripes are parallel to a radial direction of the circle, or the black and white stripes radiate outwards from the center of the circle) and/or the tangential direction (e.g., the black and white stripes are vertical to a radial direction of the circle, or the black and white stripes are concentric circles of the circle). In some embodiments, the MTF values corresponding to different spatial frequencies at a location in the circle may be determined. The MTF curves may be generated based on the MTF values. The MTF curve generated based on the pattern along the radial direction may be referred to as a sagittal MTF curve. The MTF curve generated based on the pattern along the tangential direction may be referred to as a tangential MTF curve. A same location in the circle may correspond to two MTF curves, i.e., the sagittal MTF curve and the tangential MTF curve. In some embodiments, the higher the location of an MTF curve is in the diagram (which indicates that the area under the MTF curve is larger) and the smoother the MTF curve is, the better the imaging quality of the lens system may be.

As shown in FIG. 3, the MTF curves are the MTF curves of visible light of which the wavelength is between 0.4861 μm and 0.6563 μm. The horizontal axis represents spatial frequency in circles per millimeter (in lp/mm), and the vertical axis represents the modulus of the OTF (e.g., the MTF value). As shown in FIG. 3, "T" represents the tangential MTF curve corresponding to a location and "S" represents the sagittal MTF curve corresponding to a location. "DIFF LIMIT" represents an optimal MTF curve of the lens system 200 under ideal conditions. The closer the location of an MTF curve to the "DIFF LIMIT" MTF curve, the better the image quality of the lens system may be. "0.00 DEG," "25.00 DEG," "50.00 DEG," "75.00 DEG," and "90.00 DEG" represent the angles (also referred to as imaging field angle) between a line connecting an optical center of the lens system 200 and the imaging center of the imaging field of the lens system 200, and lines connecting the optical center and the points measured to generate the MTF curves, respectively. A distance between the optical center of the lens system 200 and the imaging center of the imaging field of the lens system 200 equals to the focal length of the lens system 200, and the line connecting the optical center of the lens system 200 and the imaging center of the imaging field of the lens system 200 is perpendicular to the imaging field of the lens system 200. For example, "0.00 DEG" represents that the point measured to generate the MTF curve is the imaging center of the imaging field of the lens system 200. As shown in FIG. 3, curves 301 and 302 may be the optimal tangential MTF curve and the optimal sagittal MTF curve of the lens system 200 generated at 20° C., respectively. Curves 303, 305, 307, 309, and 311 may be the tangential MTF curves generated, at 20° C., based on points whose imaging field angles are 0.00 degrees, 25.00 degrees, 50.00 degrees, 75.00 degrees, and 90.00 degrees, respectively. Curves 304, 306, 308, 310, and 312 may be the sagittal MTF curves generated, at 20° C., based on points whose imaging field angles are 0.00 degrees, 25.00 degrees, 50.00 degrees, 75.00 degrees, and 90.00 degrees, respectively.

As shown in FIG. 3, the averages of the MTF values of the full field of view (e.g., when the spatical frequency is equal to 100 lp/mm as shown in FIG. 3) are relatively large (e.g,. larger than a threshold value 0.65), and the MTF curves are relatively smooth. As a result, the lens system 200 may achieve relatively high resolution and allow obtaining images with hight quality. For example, the lens system 200 may be applicable to a camera with an ultra-high definition resolution (e.g., a 4K resolution).

Figure 4:
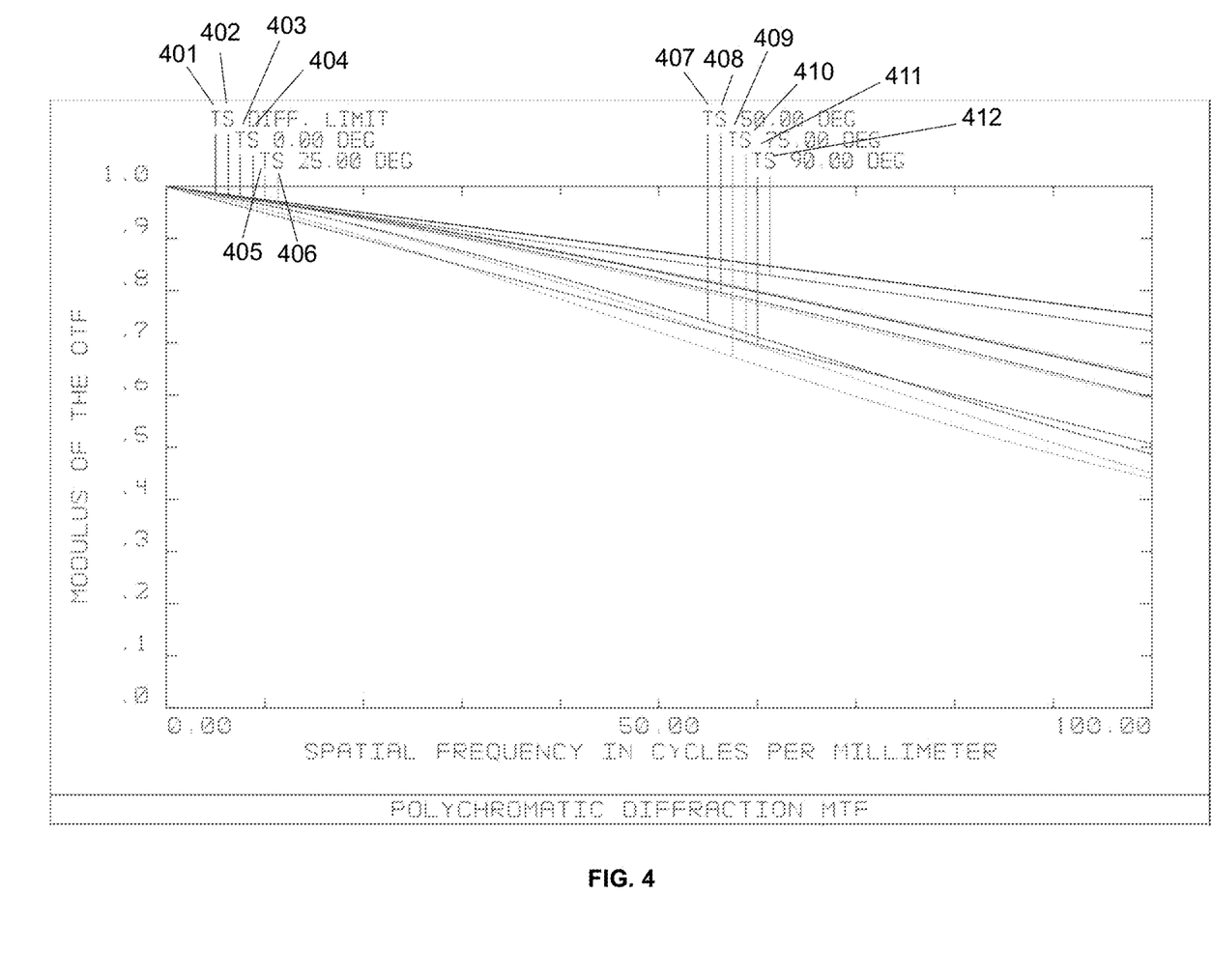
FIG. 4 is a schematic diagram of modulation transfer function (MTF) curve of infrared light of a lens system according to some embodiments of the present disclosure.

FIG. 4 is a schematic diagram of modulation transfer function (MTF) curve of infrared light of the lens system 200 according to some embodiments of the present disclosure. As shown in FIG. 4, the MTF curves are the MTF curves of infrared light of which the wavelength is 0.8500 µm. Curves 401 and 402 may be the optimal tangential MTF curve and the optimal sagittal MTF curve of infrared light of the lens system 200, respectively. Curves 403, 405, 407, 409, and 411 may be the tangential MTF curves of infrared light generated based on points whose imaging field angles are 0.00 degrees, 25.00 degrees, 50.00 degrees, 75.00 degrees, and 90.00 degrees, respectively. Curves 404, 406, 408, 410, and 412 may be the sagittal MTF curves of infrared light generated based on points whose imaging field angles are 0.00 degrees, 25.00 degrees, 50.00 degrees, 75.00 degrees, and 90.00 degrees, respectively.

As shown in FIG. 4, the averages of the MTF values of the full field of view (e.g., when the spatical frequency is equal to 60 lp/mm as shown in FIG. 4) are relatively large (e.g,. larger than a threshold value 0.65), and the MTF curves are relatively smooth.

As a result, the lens system 200 may achieve relatively high resulution and allow obtaining images with hight quality in both the visible light and the infrared light, that is, the lens system 200 may achieve a wide spectral confocal performance of 0.4 µm~0.85 µm. The lens system 200 may not only obtain images with hight quality in a daytime environment, but also obtain high quality images in a nighttime environment in the case of infrared light supplementation.

Figure 5:
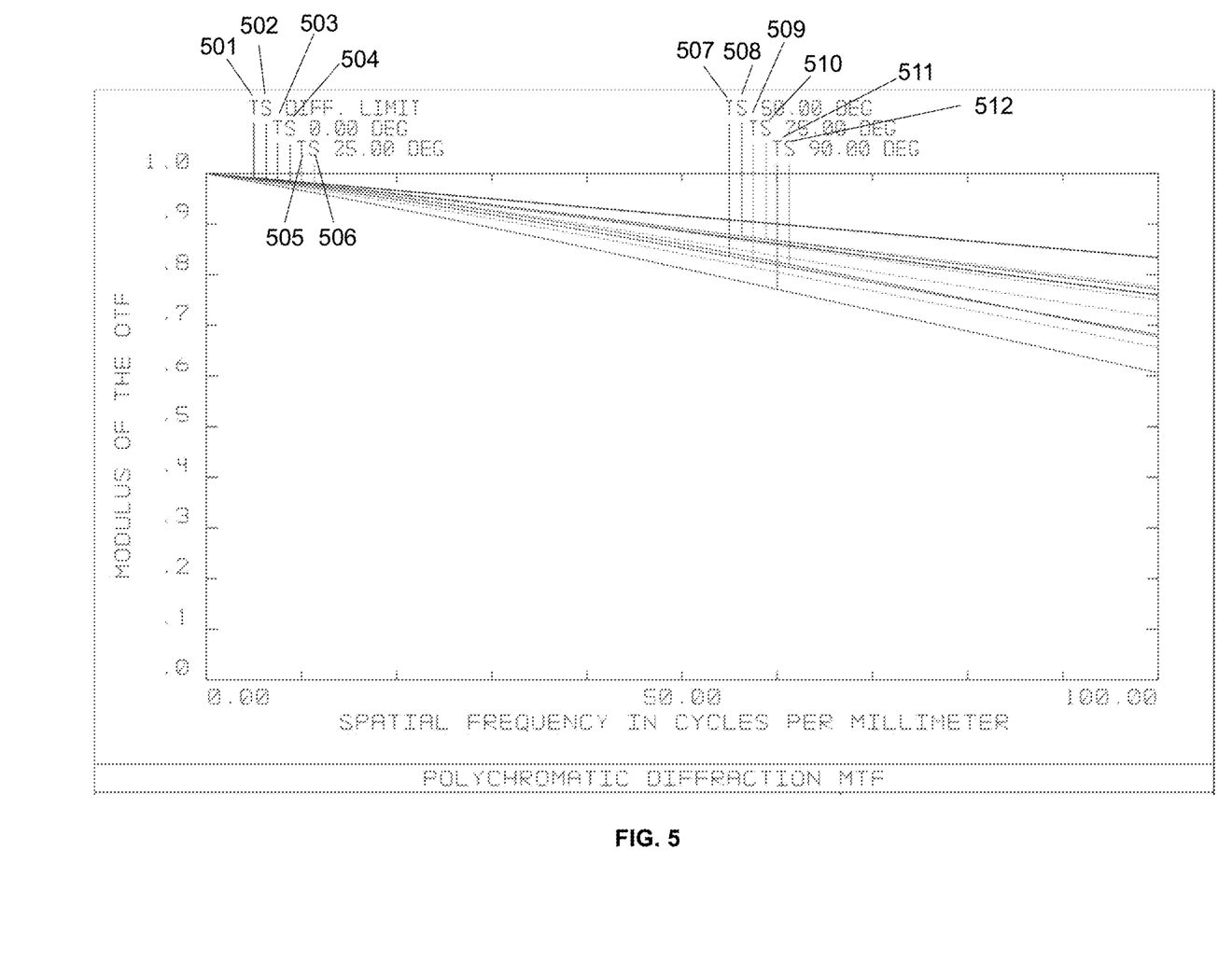
FIG. 5 is a schematic diagram of modulation transfer function (MTF) curve of a lens system at −30° C. according to some embodiments of the present disclosure.

FIG. 5 is a schematic diagram of modulation transfer function (MTF) curve of the lens system 200 at −30° C. according to some embodiments of the present disclosure. As shown in FIG. 5, the MTF curves are the MTF curves of visible light of which the wavelength is between 0.4861 µm and 0.6562 µm and Curves 501 and 502 may be the optimal tangential MTF curve and the optimal sagittal MTF curve of the lens system 200, respectively. Curves 503, 505, 507, 509, and 511 may be the tangential MTF curves generated, at −30° C., based on points whose imaging field angles are 0.00 degrees, 25.00 degrees, 50.00 degrees, 75.00 degrees, and 90.00 degrees, respectively. Curves 504, 506, 508, 510, and 512 may be the sagittal MTF curves generated, at −30° C. , based on points whose 0.00 degrees, 25.00 degrees, 50.00 degrees, 75.00 degrees, and 90.00 degrees, respectively.

Figure 6:
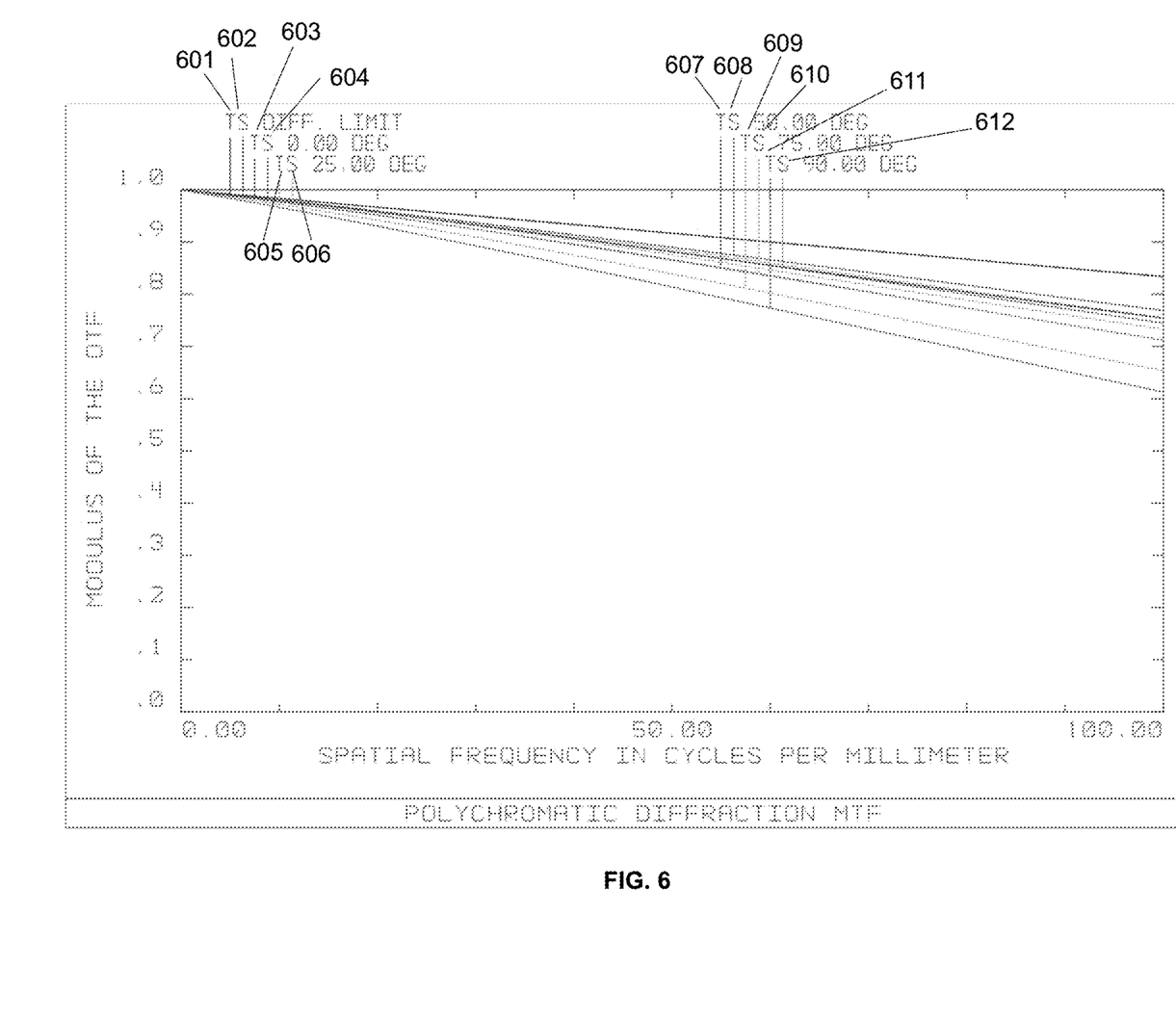
FIG. 6 is a schematic diagram of modulation transfer function (MTF) curve of a lens system at 70° C. according to some embodiments of the present disclosure.

FIG. 6 is a schematic diagram of modulation transfer function (MTF) curve of the lens system 200 at 70° C. according to some embodiments of the present disclosure. As shown in FIG. 6, the MTF curves are the MTF curves of visible light of which the wavelength is between 0.4862 µm and 0.6563 µm. Curves 601 and 602 may be the optimal tangential MTF curve and the optimal sagittal MTF curve of the lens system 200, respectively. Curves 603, 605, 607, 609, and 611 may be the tangential MTF curves generated, at 70° C., based on points whose imaging field angles are 0.00 degrees, 25.00 degrees, 50.00 degrees, 75.00 degrees, and 90.00 degrees, respectively. Curves 604, 606, 608, 610, and 612 may be the sagittal MTF curves generated, at 70° C. , based on points whose imaging field angles are 0.00 degrees, 25.00 degrees, 50.00 degrees, 75.00 degrees, and 90.00 degrees, respectively.

As shown in FIGS. 5 and 6, the averages of the MTF values of the full field of view (e.g., when the spatical frequency is equal to 100 lp/mm as shown in FIGS. 5 and 6) are relatively large (e.g,. larger than a threshold value 0.60), and the MTF curves are relativley smooth. As a result, the lens system 200 may achieve relatively high resulution and allow obtaining images with hight quality in both a high temperature environment (e.g., 70° C.) and a low temperature environment (e.g.,—30° C.).

Figure 7:
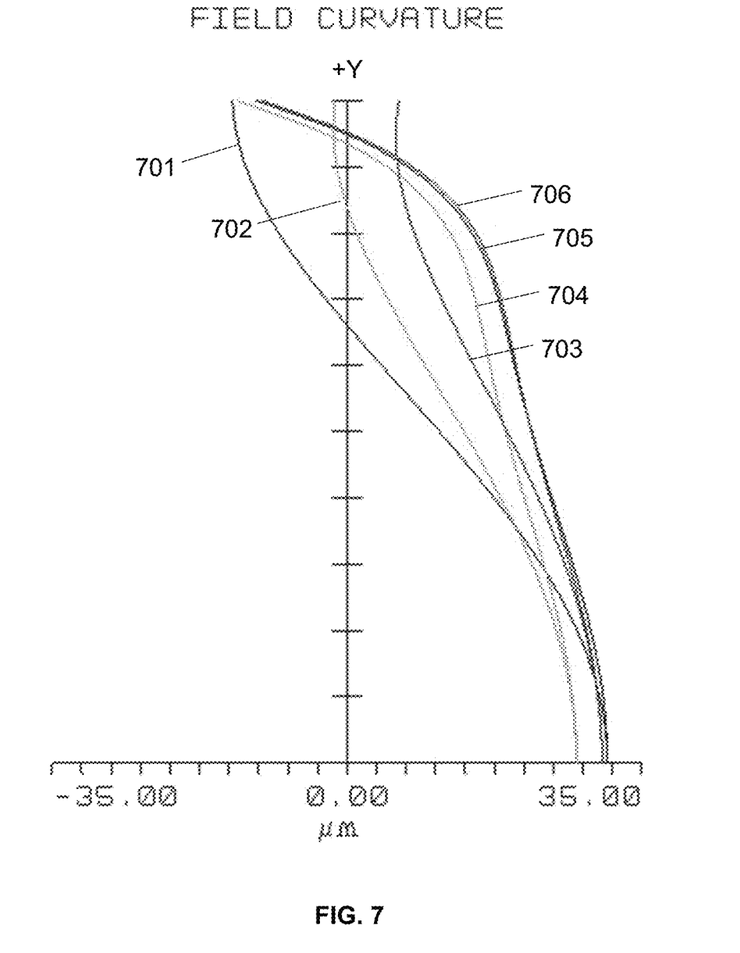
FIG. 7 is a schematic diagram of field curvature of a lens system according to some embodiments of the present disclosure.

FIG. 7 is a schematic diagram of field curvature of the lens system 200 according to some embodiments of the present disclosure.

Field curvature may be an optical aberration in which a planar object is projected to a curved (nonplanar) image and cannot be brought properly into focus on a flat image plane. This happens due to the curved nature of optical elements (e.g., the lenses) in the lens system, which project the image in a curved manner, rather than flat. A plane including the optical axis of the lens system and a point out of the optical axis may be referred to as a tangential plane. Incident rays on the tangential plane may be referred to as tangential rays. A plane that includes the optical axis of the lens system and is vertical to the tangential plane may be referred to as a sagittal plane. Incident rays on the sagittal plane may be referred to as sagittal rays. The diagram of field curvature may indicate the aberration of the tangential rays (e.g., tangential field curvature) and the aberration of the sagittal rays (e.g., sagittal field curvature) and the correction ability of field curvature of the lens system.

As shown in FIG. 7, the horizontal axis relates to the incident height of rays from an object point with respect to the lens system 200, and the vertical axis relates to the distance between the actual image point of the object point and the ideal imaging point of the object point. As shown in FIG. 7, curves 701, 702, and 703 are the field curvature curves of the tangential rays (also referred to as the tangential field curvature curves) with the wavelength of 486 nm, 587 nm, and 656 nm, respectively, of the lens system 200. Curves 704, 705, and 706 are the field curvature curves of the sagittal rays (also referred to as the sagittal field curvature curves) with the wavelength of 486 nm, 587 nm, and 656 nm, respectively, of the lens system 200. As shown in FIG. 7, the sagittal field curvature occurring in the lens system 200 is limited to a range of −35.0 µm~35.0 µm, and the tangential field curvature occurring in the lens system 200 is limited to a range of −35.0 µm~35.0 µm. As a result, the field curvature of the lens system 200 may be limited to a relatively small range, which indicates that the periphery of the image plane of the lens system 200 may have relatively high resolution.

Figure 8:
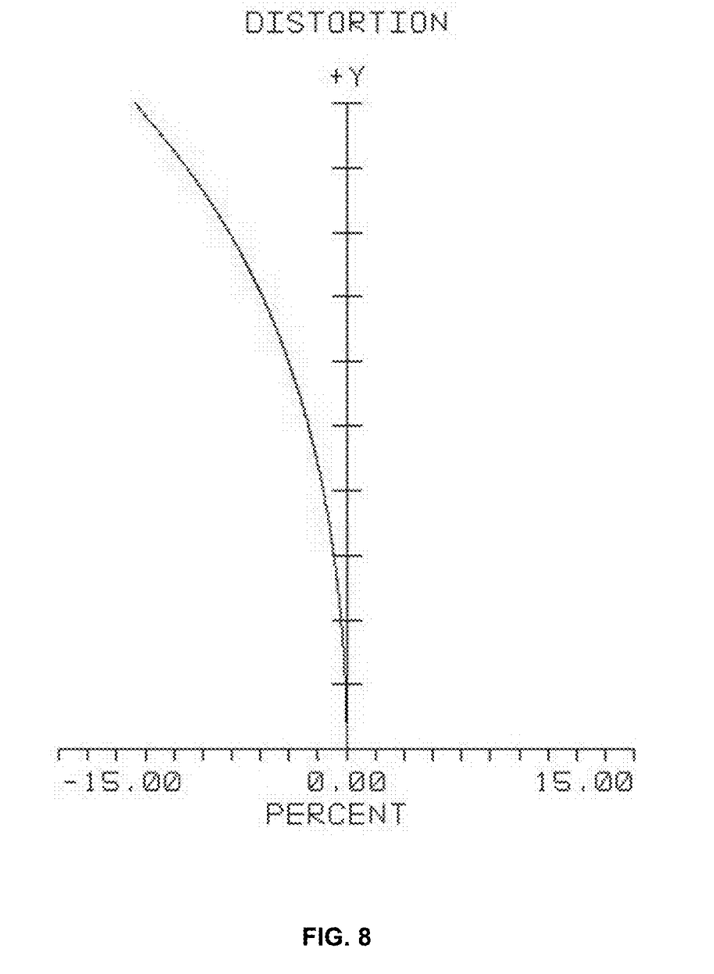
FIG. 8 is a schematic diagram illustrating F-theta distortion of a lens system according to some embodiments of the present disclosure.

FIG. 8 is a schematic diagram illustrating F-theta distortion of the lens system 200 according to some embodiments of the present disclosure.

Distortion refers to an optical aberration that deforms and bends physically straight lines and makes them appear curvy in images. Optical distortion occurs as a result of optical design, when special lens elements are used to reduce spherical and other aberrations. That is, optical distortion is a lens error. In some embodiments, the F-theta distortion may be introduced in the lens system 200 so that the image position and the angle of the incident light satisfy the linear relationship. In some embodiments, the F-theta distortion may be determined based on the focal length of the lens system 200 and the angle of the incident light.

As shown in FIG. 8, the horizontal axis relates to the F-theta distortion of the lens system 200, and the vertical axis relates to the height of the image plane of the lens system 200. The larger the absolute of the F-theta distortion, the larger the difference between the ideal image map and the distorted one. As shown in FIG. 8, the F-theta distortion of the lens system 200 is limited in a range of 0% ~ −11.0%. As a result, the F-theta distortion of the lens system 200 may be limited to a relatively small range, which indicates that the image plane of the lens system 200 may have relatively high resolution.

Figure 9:
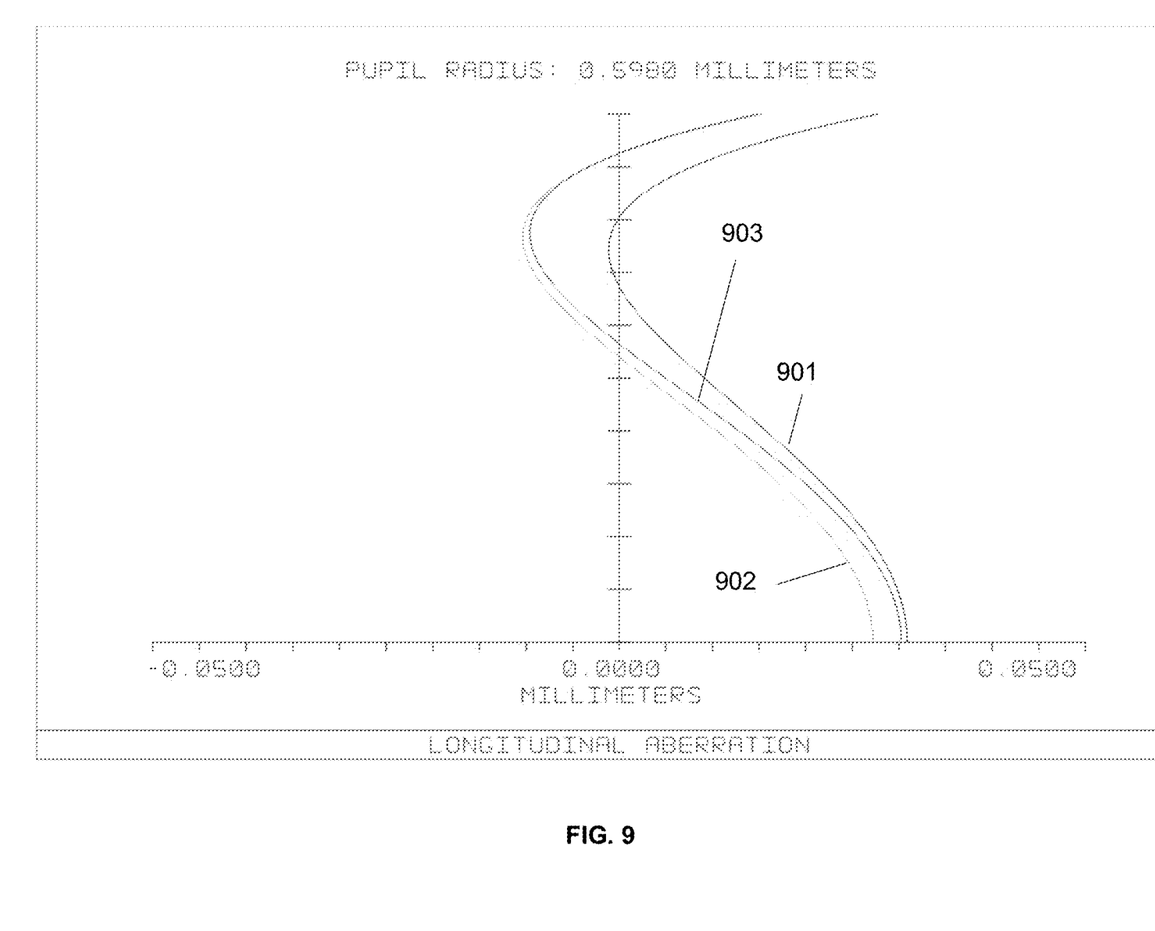
FIG. 9 is a schematic diagram illustrating axial chromatic aberration of a lens system according to some embodiments of the present disclosure.

FIG. 9 is a schematic diagram illustrating axial chromatic aberration of the lens system 200 according to some embodiments of the present disclosure.

When rays with different wavelengths from an object point at the optical axis of a lens system passes through the lens system, the rays with different wavelengths may have different image points because of axial chromatic aberration, which makes an image of the object point include colored spots and/or halos. This happens due to different focal lengths of the lens system corresponding to rays with different wavelengths.

As shown in FIG. 9, the horizontal axis relates to the incident height of rays from an object point with respect to the lens system 200, and the vertical axis relates to the distance between the actual image point of the object point and the ideal imaging point of the object point. As shown in FIG. 9, curves 901, 902, and 903 are the aberration curves of the rays with the wavelengths of 486 nm, 588 nm, and 656 nm, respectively, of the lens system 200. As shown in FIG. 9, the axial chromatic aberration occurring in the lens system 200 is limited to a range of −0.010 mm~0.035 mm. As a result, the axial chromatic aberration of the lens system 200 may be limited to a relatively small range, which increases the definition of the center and the periphery of an image generated using the lens system 200.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, the lens systems (e.g., the lens system 100, the lens system 200) described in the present disclosure may be used in an imaging device, such as a digital camera, a web camera, a video gaming console equipped with a web camera, a video camera, a motion picture camera, a broadcasting camera, or a closed circuit television (CCTV) camera. In the imaging device, an image sensor, such as a charge-coupled device (CCD) or a complementary metal oxide semiconductor (CMOS), may receive rays that are reflected by an object and pass through the lens system, and transform the rays from light signals to electronic signals. An analog-digital converter (ADC) in the imaging device may transform the electronic signals to digital signals. Image processing circuits in the imaging device may process the digital signals to generate an image of the object. A storage medium in the imaging device may record the generated image. With the imaging device, a still image, a moving image, or a video may be captured. The imaging device that is provided with the lens system in the present disclosure may achieve a high image stabilization effect and allow obtaining high quality images.

The lens system (e.g., the lens system 100, the lens system 200) and the imaging device provided by the embodiments of the present disclosure may operate in a high temperature environment (e.g., 70° C.) and a low temperature environment (e.g., −30° C.) stably without a virtual focus problem by setting the abbe constants and refractive indices of L7, and/or L9, and/or L10. The working stability, the imaging quality, and the product reliability of the lens system 200 may be improved. Due to the focal lengths of the first lens group, the second lens group, the third lens group, and the focal length of the lens system 200 satisfy a preset condition, the structure of the lens system 200 may be controlled by constraining the distribution of refractive power of each lens group in the lens system 200. The total track length and the volume of the lens system 200 may further be controlled. Thus, the miniaturization of the lens system 200 can be achieved. The lens systems 200 may be more widely used due to its suitable structure. The cost of the lens systems 100 may also be reduced. The lens system 200 may achieve relatively high resolution and allow obtaining images with high quality in both the visible light and the infrared light, that is, the lens system 200 may achieve a wide spectral confocal performance of 0.4 μm~0.85 μm. The lens system 200 may not only obtain images with high quality in a daytime environment, but also obtain high quality images in a nighttime environment in the case of infrared light supplementation. The lens system 200 may well correct the aberrations, such as spherical aberration, coma aberration, astigmatism, field curvature, distortion, axial chromatic aberration, or lateral chromatic aberration by ten optical lenses with special structures, a special arrangement of the ten optical lenses in sequence from the object side to the image side along the optical axis of the lens system 200, an suitable assignment of refractive power of each lens, and a compatible optical glass material of each lens. The structure of the lens system 200, the refractive index, the abbe constant and other parameters of each lens may be matched with the imaging conditions. Accordingly, the lens system 200 may have a compact structure (e.g., a small size), a larger aperture (e.g., F2.2), a larger FOV (e.g., above 180 degrees), a higher resolution (e.g., applicable to a camera with 4K resolution), and a better infrared confocal performance and athermalization performance. Furthermore, the lenses in the lens system 200 may be spherical lenses with a good cold working process performance, which brings the benefits of low cost, high stability, suitability for mass production. The lens system 200 may be applicable to capturing ultra high-definition (HD) images and/or video in all day in the field of, for example, security monitoring.

Having thus described the basic concepts, it may be rather apparent to those skilled in the art after reading this detailed disclosure that the foregoing detailed disclosure is intended to be presented by way of example only and is not limiting.

Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

We claim:

1. A lens system, comprising, in order from an object side to an image side:
   a first lens group having negative refractive power;
   a second lens group having positive refractive power;
   a third lens group having positive refractive power; and,
   the lens system satisfies the following condition:

$$a \leq \frac{f_1}{f'} \leq b, c \leq \frac{f_2}{f'} \leq d, e \leq \frac{f_3}{f'} \leq f,$$

and at least partial of the third lens group is made of material satisfying the following condition:
   Vd>g; and
   dn/dt≤h, wherein a is equal to −1.40, b is equal to −1.10, c is equal to 2.60, d is equal to 3.00, e is equal to 2.60, f is equal to 3.00, g is equal to 68, h is equal to 5.6×10$^{-6}$/°C, $f_1$ represents a focal length of the first lens group, $f_2$ represents a focal length of the second lens group, $f_3$ represents a focal length of the third lens group, f' represents a focal length of the lens system, Vd represents an abbe constant, n represents a refractive index, t represents temperature, and dn/dt represents a differential of refractive indices against temperature.

2. The lens system of claim 1, wherein the first lens group further comprises, in order from the object side to the image side:
   a first lens having negative refractive power;
   a second lens having negative refractive power; and,
   a third lens having negative refractive power.

3. The lens system of claim 2, wherein each of the first lens and the second lens is a meniscus lens having a convex surface facing the object side.

4. The lens system of claim 2, wherein the third lens is a planoconcave lens having a plane lens surface and a concave lens surface, and the plane lens surface faces the object side; or the third lens is a meniscus lens having a convex surface facing the object side.

5. The lens system claim 1, wherein the second lens group further comprises, in order from the object side to the image side:
   a first lens having negative refractive power;
   a second lens having positive refractive power; and,
   a thid lens having positive refractive power.

6. The lens system of claim 5, wherein the first lens is a meniscus lens having a concave surface facing the object side; or the first lens is a planoconcave lens having a plane lens surface and a concave lens surface, and the concave lens surface faces the object side.

7. The lens system claim 5, wherein the second lens is a biconvex lens; or the second lens is a planoconvex lens having a plane lens surface and a convex lens surface, and the plane lens surface faces the object side.

8. The lens system of claim 5, wherein the third lens is a meniscus lens having a convex surface facing the object side.

9. The lens system of claim 5, wherein the first lens and the second lens are commented together.

10. The lens system of claim 1, wherein the third lens group further comprises, in order from the object side to the image side:
    first lens having positive refractive power;
    second lens having negative refractive power;
    a third lens having positive refractive power; and,
    fourth lens having positive refractive power.

11. The lens system of claim 10, wherein the first lens is a planoconvex lens having a plane lens surface and a convex lens surface, and the plane lens surface faces the object side.

12. The lens system of claim 10, wherein
    second lens is a meniscus lens having a concave surface facing the object side;
    third lens is a biconvex lens; and
    fourth lens is a meniscus lens having a concave surface facing the image side.

13. The lens system of claim 10, wherein the first lens and the second lens are commented together.

14. The lens system of claim 1, wherein a ratio of total track length of the lens system to the focal length of the lens system is less than 11.

15. The lens system of claim 14, wherein the total track length of the lens system is less than 27.6 mm.

16. The lens system of claim 1, wherein a field of view of the lens system is not less than 185 degrees.

17. The lens system of claim 1, the lens system further comprising an aperture stop between the second lens group and the third lens group.

18. The lens system of claim 1, the lens system further comprising an infrared filter.

* * * * *